United States Patent [19]

Blanchard et al.

[11] Patent Number: 4,492,769

[45] Date of Patent: Jan. 8, 1985

[54] POLLUTION CONTROL CATALYST FOR INTERNAL COMBUSTION ENGINE EXHAUST SYSTEM/CATALYTIC CONVERTER AND PROCESS FOR ITS PREPARATION

[75] Inventors: Gilbert Blanchard, Le Plessis Belleville; Jean-Pierre Brunelle, Saint-Brice Sous Foret; Michel Prigent, Rueil Malmaison, all of France

[73] Assignee: Pro-Catalyse, Rueil-Malmaison, France

[21] Appl. No.: 516,844

[22] Filed: Jul. 25, 1983

[30] Foreign Application Priority Data

Jul. 26, 1982 [FR] France ............................... 82 12969

[51] Int. Cl.$^3$ ...................... B01J 23/58; B01J 23/60; B01J 23/64; B01J 23/89

[52] U.S. Cl. ................................. 502/262; 502/302; 502/303; 502/304; 502/313; 502/324; 502/326; 502/327; 502/328; 502/329; 502/331; 502/333; 502/339; 423/213.5

[58] Field of Search ............... 502/303, 304, 313, 326, 502/327, 329, 331, 333, 339, 262, 302, 324, 328; 423/213.5

[56] References Cited

U.S. PATENT DOCUMENTS

| 4,006,103 | 2/1977 | Meguerian et al. | 502/200 |
| 4,378,307 | 3/1983 | Brunelle et al. | 502/232 |
| 4,426,319 | 1/1984 | Blanchard et al. | 502/304 |

*Primary Examiner*—W. J. Shine
*Attorney, Agent, or Firm*—Burns, Doane, Swecker & Mathis

[57] ABSTRACT

A pollution control catalyst for a catalytic converter within the exhaust system of an internal combustion engine is facilely prepared by (i) coating/impregnating a catalyst support with palladium and at least one base metal catalyst, (ii) activating the step (i) catalyst, (iii) next coating/impregnating the step (ii) activated catalyst with at least one platinum group precious metal other than palladium, or combination of palladium and at least one other platinum group precious metal, and (iv) then activating the step (iii) catalyst.

17 Claims, No Drawings

POLLUTION CONTROL CATALYST FOR INTERNAL COMBUSTION ENGINE EXHAUST SYSTEM/CATALYTIC CONVERTER AND PROCESS FOR ITS PREPARATION

BACKGROUND OF THE INVENTION

1. Field of the Invention

The present invention relates to improved catalysts for the treatment of exhaust gases from internal combustion engines, and, more especially, to the preparation of such catalysts for the treatment of exhaust gases from internal combustion engines, which catalysts effect not only the oxidation of carbon monoxide and of the hydrocarbons present in said exhaust gases, but also, optionally simultaneously, the reduction of the nitrogen oxides present in these gases.

2. Description of the Prior Art

In general, the catalysts suitable for the catalytic oxidation and optionally for the catalytic reduction of the constituents present in the exhaust gases from internal combustion engines comprise a support or carrier which is coated and/or impregnated with at least one precious metal from the platinum group, such as platinum, rhodium, ruthenium, palladium or iridium, and at least one base metal, these base metals typically being selected from among: cobalt, zinc, manganese, nickel, tungsten, cerium, iron, copper, neodymium, praseodymium, rhenium, yttrium, magnesium, chromium, zirconium, molybdenum, lanthanum, tin, calcium, strontium and barium.

Such catalysts are typically prepared by the common methods either by impregnation of the support or by the introduction of the metals of the active phase during the manufacture or production of the support. In general, this is done by impregnation of the support with solutions of inorganic or organic compounds of the metals sought to be introduced.

Thus, according to published European patent application No. 27,069, assigned to the assignee hereof, it is known to produce three-way catalysts for the treatment of exhaust gases from internal combustion engines by successive impregnation of the support with a solution containing compounds of iron and of cerium, and then with a solution containing the compounds of the precious metals of the platinum group sought to be incorporated therein. Cf. U.S. Pat. No. 4,378,307, also assigned to the assignee hereof.

SUMMARY OF THE INVENTION

Accordingly, a major object of the present invention is the provision of improved technique for the preparation of palladium containing catalysts, and wherein it has surprisingly been found that the incorporation of the palladium therein is advantageously carried out by first depositing the palladium onto the support, preferably simultaneously with the incorporation of the base metals, but prior to the incorporation of the other precious metals of platinum group type.

Briefly, the present invention features the preparation of catalysts for the treatment of exhaust gases from internal combustion engines, which catalysts comprise a support which is coated and/or impregnated with at least one metal of the platinum group, including palladium, and with at least one base metal, characterized in that:

(i) in a first stage, the palladium and the base metals are incorporated onto the support;

(ii) in a second stage, activation of the catalyst is effected;

(iii) in a third stage, precious metals from the platinum group of the Periodic Table, other than palladium, are next incorporated; and (iv) in a fourth stage, the catalyst is again activated, preferably in a reducing atmosphere.

DETAILED DESCRIPTION OF THE INVENTION

More particularly according to the present invention, the support which is employed consistent herewith may be in any convenient particulate form, or in the form of a metallic or ceramic monolith coated with a layer of suitable oxide.

The particulate supports which are representative are especially those selected from among: silica, alumina, the aluminosilicates or mixed oxides containing, for example, alumina associated with silica, zirconium oxide, cerium oxide and/or titanium oxide, and the like.

In a preferred embodiment of the invention, a particulate support is used based on alumina. This support preferably has a specific surface area ranging from 25 to 250 m$^2$/g and more preferably from 70 to 150 m$^2$/g. It has a total pore volume preferably ranging from 0.5 to 2 cm$^3$/g and more preferably from 0.8 to 1.7 cm$^3$/g. It preferably has a macroporosity such that the pore volume of the pores of diameter above 1,000 Å ranges from about 0.05 to 0.6 cm$^3$/g and more particularly from 0.2 to 0.5 cm$^3$/g.

Such supports are advantageously prepared from active alumina obtained according to the process described in U.S. Pat. No. 2,915,365 and may have been agglomerated according to the process described in U.S. Pat. No. 2,881,051. Same can also be prepared by autoclaving the above agglomerates in a neutral or acidic environment, drying and calcination, as described in French Pat. Nos. 1,449,904 and 1,386,364.

The supports employed can also be prepared according to the process described in French patent application No. 77/23,880, published under No. 2,339,276.

The alumina supports employed may also be prepared according to the process described in published European patent application Nos. 15,801 and 55,164 assigned to Rhone-Poulenc.

Typically, the supports based on particles of alumina which are employed according to the invention may have been treated, as is well known to those skilled in this art, with pore-forming agents, such as those based on cellulose, naphthalene, natural gum, synthetic polymers, and the like, in order to impart to same the desired characteristics of porosity.

According to the process of the invention, supports can also be used consisting of one or more oxides coated onto a metallic or ceramic substrate, said substrate preferably being in the form of an inert and rigid honeycomb structure comprising channels or passages. Such supports are well known to those skilled in the art and have been widely described in the literature, the oxides being preferably used in the form of a film or of a coating applied to the substrate.

The oxides constituting the coating are preferably selected from among the oxides of aluminum, magnesium, calcium, strontium, barium, scandium, yttrium, lanthanides, gallium, silicon, titanium, zirconium, hafnium, thorium, niobium, tantalum, chromium, iron, tungsten, manganese and tin. It is more preferred to employ a coating of aluminum oxide.

The metallic substrates employed are preferably those obtained from alloys of iron, nickel, and chromium, or those obtained from iron, chromium, aluminum and cobalt, such as those marketed under the trademark "KANTAL" or those obtained from alloys or iron, chromium, aluminum and yttrium and marketed under the trademark "FECRALLOY". The metal may also be carbon steel or simple cast iron.

The metallic substrates based on aluminum are advantageously treated by heating same in an oxidizing atmosphere under conditions of time and temperature which make it possible to produce, from the aluminum contained in the alloy, a surface coating of aluminum oxide. In the case of carbon steels or of cast iron, it is also possible to pre-treat same by annealing the iron or steel coated with a layer of aluminum to obtain a coating of an aluminum/iron diffusion layer.

The ceramic substrates preferably utilized are those comprising as the principal constituent: cordierite, alumina, mullite, zirconia, zircomullite, barium titanate, porcelain, thorium oxide, magnesium oxide, steatite, and the carbides of boron or of silicon. In a preferred embodiment of the invention, the coating of aluminum oxide on these ceramic or metallic substrates is effected by application of alumina hydrate followed by calcining, or by the deposition of aluminum salt followed by calcining, or by the application of a layer of active alumina and calcining.

The cellular honeycomb structure may be in a hexagonal, tetragonal, triangular or undulated form. It should permit the passage of gas through the channels or passages formed during their manufacture by extrusion, lamination, solidifying of components in sheet form, or the like.

Moreover, the supports employed according to the process of the invention are advantageously treated such as to impart to same good thermal stability over time. These treatments, also well known to those skilled in the art, consist especially of a stabilization of the alumina particle or of the aluminum oxide coating with alkaline earth metals, silica and/or the rare earths.

The stabilized supports described in published French patent application Nos. 2,257,335 and 2,290,950, also assigned to Rhone-Poulenc, are suitable for the purpose of the invention.

The metals of the platinum group which are advantageously used in accordance with the invention are selected from among: platinum, rhodium, ruthenium, palladium and iridium; according to the process of the invention, palladium is used, together with at least one other metal of the platinum group.

In another preferred embodiment of the invention, palladium is used, together with at least one metal selected from among platinum, iridium and rhodium.

In the catalysts of the invention, the total content of metal of the platinum group generally ranges from about 0.02 to 0.5% by weight relative to the support. In another preferred embodiment of the invention, the content of platinum and palladium in the catalyst generally ranges from about 0.02 to 0.4% by weight relative to the support and preferably from 0.04 to 0.25% by weight; that of the metal of the group consisting of iridium and rhodium generally ranges from about 0 to 0.1% by weight and preferably from about 0.002 to 0.02% by weight relative to the support.

The ratio of the weight of platinum and palladium to the weight of iridium and/or rhodium is preferably greater than 4 and more preferably greater than 8.

In the catalysts according to the invention, the metal or metals of the platinum group are associated with one or more base metals. These base metals are selected from among at least one of the following metals: cobalt, zinc, manganese, nickel, tungsten, cerium, iron, copper, neodymium, praseodymium, rhenium, chromium, zirconium, lanthanum, tin, calcium, strontium, barium, yttrium, magnesium, titanium and gallium.

Preferred are compositions comprising the following base metals:

(1) Iron and/or cerium;
(2) Manganese and cerium and/or iron;
(3) Cerium and iron and gallium and/or yttrium;
(4) Cerium and iron and barium and/or magnesium and/or yttrium; and
(5) Lanthanum and/or neodymium.

The total base metal content relative to the support typically ranges from 0.1 to 11% by weight.

In another preferred embodiment of the invention, when iron and/or cerium are used as base metals, the iron content ranges from about 0.1 to 3.5% by weight relative to the support and more preferably from 0.5 to 2%; the cerium content ranges from about 0.3 to 7.5% and preferably from 0.5 to 5.5% by weight relative to the support.

In another preferred embodiment of the invention, when the base metals consist of manganese and cerium and/or iron, the total content of cerium and/or iron ranges from 0.1 to 11% by weight relative to the support and preferably from 0.5 to 7.5%; the manganese content ranges from 0.1 to 4% and preferably from 0.1 to 2%; the quantity of manganese and iron and/or cerium is below 15% and preferably below 9.5% by weight relative to the support.

In yet another preferred embodiment, when the base metals consist of cerium, iron, gallium and/or yttrium, the total content of cerium and iron in the catalysts ranges from about 0.1 to 11% by weight relative to the support and preferably from 9.5 to 7.5%; the gallium content ranges from 0.01 to about 10% by weight and preferably from 0.01 to 2%; the yttrium content ranges from 0.01 to 10% and preferably from 0.01 to 2%.

In still another preferred embodiment, when the base metals consist of cerium, iron, barium and/or magnesium and/or yttrium, the total content of cerium and iron in the catalysts ranges from 0.1 to 11% by weight relative to the support and preferably from 0.5 to 7.5%, and the content of the barium and/or magnesium and/or yttrium ranges from 0.01 to 3.5% and preferably from 0.01 to 2%.

In yet another preferred embodiment, when the base metals consist of lanthanum and/or neodymium, the content of lanthanum and/or neodymium ranges from 0.1 to 11% and more preferably from 0.5 to 7.5%.

Consistent with the process of the invention, in the first stage, palladium and the base metals are introduced into the support.

Palladium and the base metals may be introduced into the support by any method and, in particular, by impregnation, co-gelation, co-precipitation, and the like. Preferably, impregnation of the support is carried out with a solution containing compounds of palladium and of the base metals. Representative compounds are all of the soluble salts of the metals in question. As compounds of palladium, preferably used are palladium chloride, palladium nitrate, tetramminopalladium(II) dichloride, and the like. In another preferred embodiment of the invention, the salts of iron and of cerium which are used are preferably selected from among ferric nitrate, iron ammonium citrate, ferric chloride, cerous nitrate, cerous acetate, cerous chloride and ceric ammonium nitrate.

In the second stage of the process of the invention, the coated and/or impregnated support originating from the first stage is activated. The activation temperature ranges from about 120° to 800° C. In terms of the invention, by "activation" there is intended a heat treatment consisting of a drying process followed optionally by calcination.

In a third stage, the precious metals of the platinum group other than palladium are introduced. These metals are introduced by impregnation with compounds of the precious metals. In a preferred embodiment, use is made of: hydrated rhodium trichloride, chloroplatinic acid, chloropentaamminorhodium(III) dichloride and tetraamminoplatinum(II) dichloride, bromoplatinic acid, rhodium nitrate and hexachloroiridic acid.

As is also well known to those skilled in the art, the depth of impregnation may be advantageously regulated by addition of a certain quantity of mineral or organic acid to the solution of the precious metals. Nitric, phosphoric, hydrochloric and hydrofluoric acids, or acetic, citric and oxalic acids, and the like, are conventionally used for this purpose.

In a fourth stage of the process of the invention, the catalyst is preferably activated in a reducing atmosphere. The activation is preferably carried out at a temperature ranging from 300° to 800° C. for several hours; as the reducing agent, particularly exemplary are hydrogen, carbon monoxide and/or hydrogen sulfide.

The catalysts according to the invention thus prepared have a stability over time which is considerably improved for eliminating the harmful compounds contained in the exhaust gases and, particularly, carbon monoxide, unburnt hydrocarbons, and, if appropriate, the oxides of nitrogen which are present therein.

In another embodiment of the process of the invention, during the first stage only at least one-half of the total amount of palladium contained in the catalyst is introduced; in this case, the remaining fracture is introduced during the third stage with the other precious metals.

EXAMPLE 1

Preparation of a Prior Art Catalyst (A)

100 g of alumina beads having the gamma structure were prepared according to the processes described in French Pat. Nos. 1,449,904 and 1,386,364 by autoclaving agglomerates of active alumina in the presence of acid, and then by drying and calcination.

These alumina beads had a specific surface area of 100 m$^2$/g, a total pore volume of 0.90 cm$^3$/g and a volume of 0.40 cm$^3$/g constituted of macropores of a diameter greater than 1,000 Å.

The beads were impregnated with 90 cm$^3$ of an aqueous solution of iron nitrate and of cerous nitrate containing 1.5 g of iron and 4.0 g of cerium.

After 30 minutes of impregnation, the beads were dried at 150° C. and then calcined in air at 400° C. for 3 hours.

Same were next impregnated with 90 cm$^3$ of a solution of chloroplatinic acid, of hydrated rhodium trichloride and of palladium nitrate containing 150 mg of platinum, 7.3 mg of rhodium and 50 mg of palladium.

After 30 minutes of impregnation, the beads were dried at 150° C. and then calcined at 300° C. for 3 hours in a stream of air circulating at a rate of 200 liters per hour.

The catalyst (A) thus prepared contained 0.150% of platinum, 0.0073% of rhodium, 0.050% of palladium, 1.5% of iron and 4.0% of cerium, all by weight relative to the support.

EXAMPLE 2

Preparation of a Prior Art Catalyst (B)

100 g of the beads described in Example 1 were impregnated with 90 cm$^3$ of an aqueous solution of iron nitrate, cerium nitrate and manganese nitrate, containing 1.0 g of iron, 4 g of cerium and 1 g of manganese.

After 30 minutes of impregnation, the beads were dried at 150° C. and then calcined in air at 400° C. for 3 hours. They were next impregnated with 90 cm$^3$ of a solution of chloroplatinic acid, palladium chloride and hydrated rhodium trichloride, containing 75 mg of platinum, 75 mg of palladium and 7.3 mg of rhodium.

The catalyst was next treated as in Example 1.

The catalyst (B) thus prepared contained 0.075% of platinum, 0.075% of palladium, 0.0073% of rhodium, 1% of iron, 4% of cerium and 1% of manganese, all by weight relative to the support.

EXAMPLE 3

Preparation of a Prior Art Catalyst (C)

100 g of alumina beads were prepared according to the process described in published French patent application No. 79/04,810.

These beads had a specific surface area of 100 m$^2$/g, a total pore volume of 1.20 cm$^3$/g and a volume of 0.45 cm$^3$/g constituted of macropores of a diameter greater than 1,000 Å.

The method of impregnation was similar to that described in Example 2; but 120 cm$^3$ of an aqueous solution of ferric nitrate, cupric nitrate and cerous nitrate were used, containing 2 g of iron, 0.5 g of copper and 4.0 g of cerium, and then 120 cm$^3$ of a solution of chloroplatinic acid, palladium chloride and hydrated rhodium trichloride, containing 100 mg of platinum, 50 mg of palladium and 7.3 mg of rhodium.

The catalyst (C) thus prepared contained 0.100% of platinum, 0.050% of palladium, 0.0073% of rhodium, 2% of iron, 0.5% of copper and 4.0% of cerium, all by weight relative to the support.

EXAMPLE 4

Preparation of a Catalyst (D) According to the Invention 100 g of the alumina beads described in Example 3 were impregnated with 120 cm$^3$ of an aqueous solution of iron nitrate, cerium nitrate, palladium nitrate and manganese nitrate, containing 1.0 g of iron, 4 g of cerium, 75 mg of palladium and 1 g of manganese.

After 30 minutes of impregnation, the beads were dried at 150° C. and then calcined in air at 400° C. for 3 hours.

Same were next impregnated with 120 cm$^3$ of a solution of chloroplatinic acid and hydrated rhodium trichloride, containing 75 mg of platinum and 7.3 mg of rhodium.

After 30 minutes of impregnation, the beads were dried at 150° C. and then activated at 300° C. for 3 hours in a stream of air circulating at a rate of 200 liters per hour.

The catalyst (D) thus prepared contained 0.075% of platinum, 0.075% of palladium, 0.0073% of rhodium, 1% of iron, 4% of cerium and 1% of manganese, all by weight relative to the support.

EXAMPLE 5

Preparation of a Catalyst (E) According to the Invention 100 g of the beads described in Example 3 were impregnated with 120 cm$^3$ of an aqueous solution of ferric nitrate, cerous nitrate, barium nitrate and palladium chloride, containing 1.5 g of iron, 4.0 g of cerium, 2.0 g of barium and 50 mg of palladium.

After 30 minutes of impregnation, the beads were dried at 150° C. and then calcined in air at 400° C. for 3 hours. Same were next impregnated with 120 cm$^3$ of a solution of chloroplatinic acid and hydrated rhodium trichloride, containing 100 mg of platinum and 7.3 mg of rhodium. After 30 minutes of impregnation, the beads were dried at 150° C. and then activated at 300° C. for 3 hours in a stream of hydrogen circulating at a rate of 200 liters per hour.

The catalyst (E) thus prepared contained 0.100% of platinum, 0.050% of palladium, 0.0073% of rhodium, 1.5% of iron, 4% of cerium and 2% of barium, all by weight relative to the support.

EXAMPLE 6

Preparation of a Catalyst (F) According to the Invention 100 g of the beads as described in Example 3 were impregnated firstly with 120 cm$^3$ of an aqueous solution of ferric nitrate, cerous nitrate, palladium chloride, yttrium nitrate and barium nitrate, containing 1.5 g of iron, 3.50 g of cerium, 75 mg of palladium, 0.2 g of yttrium and 0.5 g of barium, and, secondly, with 120 cm$^3$ of an aqueous solution of hexachloroplatinic acid and rhodium trichloride, containing 65 mg of platinum and 5 mg of rhodium.

The catalyst (F) was treated as in Example 5.

The catalyst (F) thus prepared contained 0.065% of platinum, 0.075% of palladium, 0.005% of rhodium, 1.5% of iron, 3.50% of cerium, 0.2% of yttrium and 0.5% of barium, all by weight relative to the support.

EXAMPLE 7

Preparation of a Catalyst (G) According to the Invention

A suspension in water was prepared, of an alumina suitable for coating a monolithic metallic structure marketed under the trademark "Fecralloy".

The 1.7 liter monolith was submerged in the suspension containing 30% by weight of alumina at a pH of 3.5. Such support was drained and dried to empty the channels, and then was calcined at 600° C. for 3 hours. The monolith thus coated was immersed in an aqueous solution of ferric nitrate, cerium nitrate and palladium nitrate for 30 minutes, and was then drained and dried at 150° C. and calcined at 400° C. for 3 hours. The concentrations of ferric nitrate, cerium nitrate and palladium nitrate in the solution were such that, after immersion and calcination, the monolith contained 0.8% by weight of iron, 5.5% by weight of cerium and 0.1% by weight of palladium.

This substrate was next impregnated by soaking in an aqueous solution of chloroplatinic acid and hydrated rhodium trichloride.

The concentrations of chloroplatinic acid and hydrated rhodium trichloride were such that the monolith was impregnated with 75 mg of platinum and 7.3 mg of rhodium. After 30 minutes of impregnation, the monolith was drained and dried at 150° C., and then activated at 400° C. for 3 hours in a stream of hydrogen circulating at a rate of 200 liters per hour.

The catalyst (G) thus prepared contained 0.075% of platinum, 0.0073% of rhodium, 0.1% of palladium, 0.8% of iron and 5.5% of cerium, all by weight relative to the support.

EXAMPLE 8

Preparation of a Catalyst (H) According to the Invention

A suspension in water was prepared, of an alumina suitable for coating a monolithic ceramic honeycomb structure having a volume of 1.7 liters.

The procedure employed for impregnation was similar to that described in Example 7. In this example, an aqueous solution of ferric nitrate, cerium nitrate, palladium nitrate and barium nitrate was used, the concentrations of which were such that after immersion and calcination the monolith contained 1.2% by weight of iron, 4% by weight of cerium, 0.075% by weight of palladium and 1% of barium. The substrate was next impregnated by soaking in an aqueous solution of chloroplatinic acid and hydrated rhodium trichloride.

The catalyst (H) thus prepared contained 0.10% of platinum, 0.0073% of rhodium, 0.075% of palladium, 1.2% of iron, 4% of cerium and 1% of barium, all by weight relative to the support.

EXAMPLE 9

Activity of the various catalysts determined on a vehicle on the American CVS-CH cycle The present example summarizes the results obtained from a vehicle test on the American CVS-CH cycle type, utilizing the various catalysts (A), (B), (C), (D), (E), (F), (G) and (H) respectively described in Examples 1 to 8.

The conditions of this test are reported in the following publication: *Federal Register*, vol. 42, No. 124, pages 32906 to 33004 (June 28, 1977); Title 40: Protection of Environment, Chap. 1, Environmental Protection Agency, Part 86, Control of air pollution from new motor vehicles and new motor vehicle engines.

The test vehicle was a RENAULT R 17 TS equipped with a BOSCH-L JETRONIC prototype electronic injection device regulated by an oxygen sensor. The inertia of this vehicle was 2,750 lbs (1,250 kg). The adjustment of the hydraulic brake simulating road resistance, in accordance with the U.S. Federal Standard, corresponded, on the chassis dynamometer used, to a traction force of 25 kg f at 80 km/h.

The base exhaust emissions of the vehicle, without a catalytic converter, were as follows:

| | |
|---|---|
| CO | 12.3 g/mile |
| HC | 1.8 g/mile |

-continued

| NO$_x$ | 2.4 g/mile |
|---|---|

An experimental catalytic converter of cylindrical type, having a volume of 1,700 cm$^3$, was engaged into the exhaust circuit at a distance of about 1.7 m from the engine.

The Table I below summarizes the results obtained with the various catalysts (A), (B), (C), (D), (E), (F), (G) and (H) respectively described in Examples 1 to 8.

Table I: Emissions of carbon monoxide (CO), hydrocarbons (HC) and nitrogen oxides (NO$_x$) measured on a vehicle on the, American CVS-CH cycle, and expressed in grams per mile.

TABLE I

| | Example number | Catalyst reference | Emissions After aging of the catalyst in a test engine for 500 hours at 680° C. | | |
|---|---|---|---|---|---|
| | | | CO | HC | NO$_x$ |
| PRIOR ART | 1 | A | 5.80 | 0.73 | 1.20 |
| | 2 | B | 8.70 | 1.50 | 2.01 |
| | 3 | C | 6.15 | 0.70 | 1.10 |
| INVENTION | 4 | D | 3.12 | 0.40 | 0.53 |
| | 5 | E | 3.08 | 0.38 | 0.42 |
| | 6 | F | 3.30 | 0.37 | 0.50 |
| | 7 | G | 3.90 | 0.60 | 0.70 |
| | 8 | H | 3.20 | 0.40 | 0.55 |

EXAMPLE 10

Preparation of a Catalyst (J) According to the Invention 100 g of alumina beads having the gamma structure were prepared according to the processes described in French Pat. Nos. 1,449,904 and 1,386,364 by autoclaving agglomerates of active alumina in the presence of acid, and then by drying and calcination.

The resulting alumina beads had a specific surface area of 100 m$^2$/g, a total pore volume of 0.90 cm$^3$/g and a volume of 0.40 cm$^3$/g constituted of macropores having a diameter greater than 1,000 Å.

These beads were impregnated with 90 cm$^3$ of an aqueous solution of cerous nitrate containing 4.0 g of cerium. After 30 minutes of impregnation, the beads were dried at 150° C. and then calcined in air at 400° C. for 3 hours.

The beads were next impregnated with 90 cm$^3$ of a solution of chloroplatinic acid and palladium nitrate, containing 100 mg of platinum and 50 mg of palladium.

After 30 minutes of impregnation, the beads were dried at 150° C., and then activated at 400° C. for 3 hours in a stream of hydrogen circulating at a rate of 200 liters per hour.

The catalyst (J) thus prepared contained 0.100% of platinum; 0.050% of palladium and 4.0% of cerium, all by weight relative to the support.

EXAMPLE 11

Preparation of a prior art catalyst (K)

100 g of alumina beads were prepared according to the process described in published European patent application No. 15,801.

These beads had a specific surface area of 100 m$^2$/g, a total pore volume of 1.20 cm$^3$/g and a volume of 0.45 cm$^3$/g constituted of macropores having a diameter greater than 1,000 Å.

The procedure employed for the impregnation was similar to that described in Example 10, but 120 cm$^3$ of an aqueous solution of lanthanum nitrate containing 3% of lanthanum, and 120 cm$^3$ of a solution of chloroplatinic acid and palladium chloride, containing 50 mg of platinum and 100 mg of palladium, were used instead.

The catalyst (K) thus prepared contained 0.050% of platinum, 0.100% of palladium and 3% of lanthanum, all by weight relative to the support.

EXAMPLE 12

Preparation of a prior art catalyst (L)

A suspension in water was prepared of an alumina suitable for coating a metallic monolithic structure marketed under the trademark "Fecralloy".

The 0.8 liter monolith (100 g) was submerged in the suspension containing 30% by weight of alumina at a pH of 3.5. The aforesaid support was drained and dried to empty the channels, and was then calcined at 600° C. for 3 hours. The monolith thus coated was immersed in an aqueous solution of neodymium nitrate for 30 minutes, and was then drained and dried at 150° C. and calcined at 400° C. for 3 hours. The concentration of neodymium nitrate in the solution was such that, after immersion and calcination, the monolith contained 4.5% by weight of neodymium.

The substrate was next impregnated by soaking in an aqueous solution of chloroplatinic acid and palladium chloride.

The concentrations of chloroplatinic acid and palladium chloride were such that the monolith was impregnated with 750 mg of platinum and 750 mg of palladium. After 30 minutes of impregnation, the monolith was drained and dried at 150° C., and then activated at 400° C. for 3 hours in a stream of hydrogen circulating at a rate of 200 liters per hour.

The catalyst (L) thus prepared contained 0.075% of platinum, 0.75% of palladium and 4.5% of neodymium, all by weight relative to the support.

EXAMPLE 13

Preparation of a Catalyst (M) According to the Invention 100 g of the alumina beads described in Example 10 were impregnated with 90 cm$^3$ of an aqueous solution of iron nitrate, cerium nitrate and palladium nitrate, containing 1.0 g of iron, 4 g of cerium and 0.100 g of palladium.

After 30 minutes of impregnation, the beads were dried at 150° C., and then calcined in air at 400° C. for 3 hours. Same were next impregnated with 90 cm$^3$ of a solution of chloroplatinic acid, containing 50 mg of platinum.

After 30 minutes of impregnation, the beads were dried at 150° C., and then activated at 400° C. for 3 hours in a stream of hydrogen circulating at a rate of 200 liters per hour.

The catalyst (M) thus prepared contained 0.050% of platinum, 0.100% of palladium, 1.0% of iron and 4% of cerium, all by weight relative to the support.

EXAMPLE 14

Preparation of a Catalyst (N) According to the Invention 100 g of the alumina beads described in Example 11 were impregnated with 120 cm³ of an aqueous solution of iron nitrate, cerium nitrate, magnesium nitrate and palladium chloride, containing 1.5 g of iron, 3.5 g of cerium, 1 g of magnesium and 0.075 g of palladium.

After 30 minutes of impregnation, the beads were dried at 150° C., and then calcined in air at 400° C. for 3 hours. Same were next impregnated with 120 cm³ of a solution of chloroplatinic acid, containing 0.075 g of platinum. The beads were next treated as in Example 13.

The catalyst (N) thus prepared contained 0.075% of platinum, 0.075% of palladium, 1.5% of iron, 3.5% of cerium and 1% of magnesium all by weight relative to the support.

EXAMPLE 15

Preparation of a Catalyst (O) According to the Invention 100 g of beads of alumina having the gamma structure were prepared according to the processes described in French Pat. Nos. 1,499,904 and 1,386,364 by autoclaving agglomerates of active alumina in the presence of acid, and then by drying and calcination.

The procedure employed for the impregnation was similar to that described in Example 10, but 90 cm³ of an aqueous solution of lanthanum nitrate, neodymium nitrate and palladium nitrate was used, containing 2 g of lanthanum, 2.0 g of neodymium and 0.100 g of palladium, as was 90 cm³ of a solution of chloroplatinic acid and hydrated rhodium trichloride, containing 50 mg of platinum.

The catalyst (O) thus prepared contained 0.050% of platinum, 0.100% of palladium, 2% of lanthanum and 2% of neodymium, all by weight relative to the support.

EXAMPLE 16

Preparation of a Catalyst (P) According to the Invention

A suspension in water was prepared of an alumina suitable for coating a monolithic ceramic honeycomb structure.

The procedure employed for the impregnation was similar to that described in Example 8, but an aqueous solution of lanthanum nitrate and palladium nitrate was used instead, the concentrations of which were such that after immersion and calcination, the monolith contained 4.5% by weight of lanthanum and 0.075% of palladium. The substrate was next impregnated by soaking in an aqueous solution of chloroplatinic acid.

The catalyst (P) thus prepared contained 0.075% of platinum, 0.075% of palladium and 4.5% of lanthanum, all by weight relative to the support.

EXAMPLE 17

Activity of the various catalysts determined on a vehicle

This example summarizes the results obtained on a vehicle, utilizing the various catalysts (J), (K), (L), (M), (N), (O) and (P) respectively described in Examples 10, 11, 12, 13, 14, 15 and 16.

The tests were carried out by successively introducing 1,700 cm³ of each of the catalysts in the form of shaped bodies into a cylindrical type reactor provided with axial circulation (internal diameter, 18.25 cm; thickness of the catalyst bed, 6.5 cm). The catalysts prepared on a 1.7 liter ceramic monolith or a 0.8 liter metallic monolith were placed within appropriate cylindrical reactor.

The reactor was fitted to the exhaust system of a bench test engine, there being interposed between the engine and the reactor, a device enabling regulation of the temperature of the gases to 530° C. at the reactor inlet.

The engine was a gasoline automobile engine comprising 4 cylinders, a displacement of 1,600 cm³ and a compression ratio of 8.8/1. It was coupled to a hydraulic brake and ran under stabilized conditions at 3,000 r.p.m., providing a power of about 25 kw.

Furthermore, in order to enable the catalytic combustion of the uncombusted materials, secondary air was introduced into the exhaust gases upstream of the reactor through a natural air suction device fitted with "Pulsair" valves. The rate of flow of the exhaust gases over the catalyst was, under these conditions, 46 Nm³/hour, and the initial level of the principal pollutants was as follows:

| | | |
|---|---|---|
| (1) | Carbon Monoxide (CO) | 0.55% by volume |
| (2) | Unburnt hydrocarbons (HC) | 0.14% by volume, expressed as methane |

The determination of these compounds was carried out before and after passage of the exhaust gases over the catalyst employing the following usual analytical techniques:

(1) CO: Infrared absorption (COSMA Rubis 3000 analyzer);
(2) HC: Flame ionization analysis (IPM analyzer).

TABLE II

Purification rates determined from test engine expressed as a percentage of carbon monoxide (CO) and hydrocarbons (HC) eliminated

| | Example number | Catalyst reference | Purification rates for a fresh catalyst stabilized for 1 hour | | Purification rates after aging of the catalyst in the test engine for 800 hours | |
|---|---|---|---|---|---|---|
| | | | CO | HC | CO | HC |
| PRIOR ART | 10 | J | 95 | 91 | 70 | 55 |
| | 11 | K | 97 | 90 | 67 | 57 |
| INVENTION | 12 | L | 87 | 71 | 53 | 31 |
| | 13 | M | 95 | 92 | 90 | 83 |
| | 14 | N | 98 | 93 | 87 | 80 |
| | 15 | O | 94 | 89 | 80 | 72 |
| | 16 | P | 92 | 90 | 75 | 70 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of a catalyst composition adopted for the treatment of internal combustion engine exhaust gases, comprising (i) coating and/or impregnating a support with a catalyst of palladium and at least one base metal element, (ii) activating the step (i) catalyst at a temperature ranging from 120° to 800° C., (iii) next coating and/or impregnating the step (ii) activated catalyst with at least one platinum group precious metal other than palladium, or a combination of palladium and at least one other platinum group precious metal, and (iv) thence activating the step (iii) catalyst at a temperature ranging from 300° to 800° C.

2. The process as defined by claim 1, said platinum group precious metal comprising platinum, rhodium, ruthenium and iridium.

3. The process as defined by claim 2, said platinum group precious metal comprising platinum, iridium and rhodium.

4. The process as defined by claim 2, said at least one base metal element comprising cobalt, zinc, manganese, nickel, tungsten, cerium, iron, copper, neodymium, praseodymium, rhenium, chromium, zirconium, lanthanum, tin, calcium, strontium, barium, yttrium, magnesium, titanium and gallium.

5. The process as defined by claim 4, said at least one base metal element comprising (a) iron and/or cerium, (b) manganese and cerium and/or iron, (c) cerium, iron, gallium and/or yttrium, (d) cerium, iron, barium and/or magnesium and/or yttrium, and (e) lanthanum and/or neodymium.

6. The process as defined by claim 1, comprising carrying out said step (i) by immersing said support in a solution which comprises compounds of palladium and of the base metal.

7. The process as defined by claim 1, comprising carrying out said step (i) by co-gelation.

8. The process as defined by claim 1, comprising carrying out said step (i) by co-precipitation.

9. The process as defined by claim 6, said compounds of palladium comprising palladium chloride, palladium nitrate and tetraamminopalladium(II) dichloride.

10. The process as defined by claim 1, said activating step (iv) being carried out under a reducing atmosphere.

11. The process as defined by claim 1, said catalyst support comprising particulates of silica, alumina, aluminosilicate or mixed oxides.

12. The process as defined by claim 1, said catalyst support comprising an oxide-coated metallic substrate.

13. The process as defined by claim 1, said catalyst support comprising an oxide-coated ceramic substrate.

14. The process as defined by claim 1, said catalyst support comprising a honeycomb.

15. The process as defined by claim 1, said product catalyst composition comprising a total amount of platinum group metal ranging from 0.02 to 0.5% by weight, based upon the weight of the support.

16. The process as defined by claim 15, said product catalyst composition comprising a total amount of base metal ranging from 0.1 to 11% by weight, based upon the weight of the support.

17. The catalyst composition prepared by the process as defined by claim 1.

* * * * *